(12) United States Patent
Tilley et al.

(10) Patent No.: US 7,667,431 B2
(45) Date of Patent: Feb. 23, 2010

(54) MECHANICALLY FEATURELESS INDUCTIVE CHARGING USING AN ALIGNMENT MARKING FEATURE

(75) Inventors: Patrick Tilley, Coram, NY (US); Thomas Wulff, No.Patchogue, NY (US)

(73) Assignee: Motorola, Inc., Holtsville, NY (US)

( * ) Notice: Subject to any disclaimer, the term of this patent is extended or adjusted under 35 U.S.C. 154(b) by 322 days.

(21) Appl. No.: 11/687,136

(22) Filed: Mar. 16, 2007

(65) Prior Publication Data

US 2008/0224655 A1    Sep. 18, 2008

(51) Int. Cl.
*H01M 10/44*    (2006.01)
*H01M 10/46*    (2006.01)

(52) U.S. Cl. .................................. 320/108
(58) Field of Classification Search ............. 320/107, 320/108, 112, 114, 115
See application file for complete search history.

(56) References Cited

U.S. PATENT DOCUMENTS

| | | | | |
|---|---|---|---|---|
| 5,680,028 | A | * | 10/1997 | McEachern ............. 320/108 |
| 2006/0061324 | A1 | * | 3/2006 | Oglesbee ................ 320/108 |
| 2006/0061325 | A1 | * | 3/2006 | Tang et al. ............. 320/108 |

* cited by examiner

*Primary Examiner*—Edward Tso
(74) *Attorney, Agent, or Firm*—Thorne & Halajian, LLP

(57) ABSTRACT

An inductive charging system including an inductive charger having an inductive charging surface and an alignment feature depicted on a surface of the inductive charger indicating a location of the inductive charging surface. A structural feature may extend substantially perpendicular to the alignment feature and provides a guide for positioning of a portable device to facilitate inductive changing of the portable device by the inductive charging surface. The inductive charger may include a plurality of inductive chargers positioned to facilitate charging of a portable device by two or more of the plurality of the inductive chargers.

21 Claims, 4 Drawing Sheets

MECHANICALLY FEATURELESS INDUCTIVE CHARGING USING AN ALIGNMENT MARKING FEATURE

FIELD OF THE INVENTION

The present system relates to a unique device non-specific inductive charging system.

BACKGROUND OF THE INVENTION

In today's world of portable devices, such as laptops, personal digital assistants (PDAs), cell phones, and other devices of the like, a limiting factor for this technology is the requirements for powering the technology. Throw away batteries are replaced in many of today's electronics with rechargeable batteries and to simplify the recharging process, oftentimes the rechargeable batteries may be recharged while still in the portable device.

Typically, the portable device is fitted with a particular connector, oftentimes proprietary in design, and a corresponding charging device is fitted with a mating connector, such as an interlocking connector, so that the charging device may be utilized for recharging the rechargeable batteries. The charging device contains a transformer that transforms a supply current, typically an alternating current (AC) source (e.g., 120 AC volts, 220 AC volts, etc.), into a source current that is suitable for the portable device, typically as direct current (DC) or pseudo-direct current such as provided by a half-wave rectifying circuit.

In one embodiment for providing a suitable charging power source for a portable device, a charging device may contain a transformer typically made up of two windings or coils, a primary winding/coil and a secondary winding/coil. The primary winding is connected to the supply current which creates a magnetic field around the primary winding. In operation, the magnetic field around the primary winding induces a current in the secondary winding. By adjusting a ratio of the windings between the primary and secondary coils, a desired change in voltage may be accomplished, which together with further conditioning, may produce the voltage required for the rechargeable batteries.

The connector on the portable device may in some cases also be utilized for data transfer between the portable device and another device, such as a computer system. In many cases, a particular individual may have upward of five or more of these charging systems for operation of the individual's portable devices. Due to the proprietary nature of the connectors and differences in charging requirements (voltage, power, etc.), oftentimes none of the charging systems are interchangeable. Some prior systems are outfitted with interchangeable connectors for the purposes of providing a charging system that is suitable for more than one device.

In some cases, typically wherein having an open connector may provide a source of environmental contaminants, a sealed charging device may be provided utilizing an inductive charging system. The inductive charging system does not require electrical contact between the charging device and the portable device in that the transformer is split between the charging device and the portable device with the primary winding residing in the charging device and the secondary winding residing in the portable device. In this way, even without direct electrical contact, the rechargeable batteries of the portable device may be recharged. As an additional benefit, since no electrical contact is required, the portable device may be sealed against environmental contaminants.

However, the inductive charging systems in use follow a system of mechanically ensuring proper alignment between the first and second windings to help promote efficiency of the charging between the two. Typically, the charging device has unique mechanical features, such as protrusions, recesses, etc. and the portable device has complementary mechanical features. In this way, the charging device and portable device mate together, similar as the mating pairs of previous electrical connectors. Due to the unique mechanical features of the present inductive charging systems, a user is still faced with a dilemma of having a unique charging system for each portable device, even if each portable device utilizes an inductive charging system.

It is an object of the present system to overcome disadvantages and/or make improvements in the prior art.

SUMMARY OF THE INVENTION

An inductive charging system including an inductive charger having an inductive charging surface and an alignment feature depicted on a surface of the inductive charger indicating a location of the inductive charging surface. In one embodiment, a structural feature may extend substantially perpendicular to the alignment feature and provides a guide for positioning of a portable device to facilitate inductive changing of the portable device by the inductive charging surface. The inductive charger may include a plurality of inductive chargers. The plurality of inductive chargers may include a field of inductive chargers positioned to facilitate charging of a portable device by two or more of the plurality of the inductive chargers.

In one embodiment, the inductive charging surface may be a raised surface extending outward from the surface of the inductive charger. The raised inductive charging surface may be parallel to the surface of the inductive charger or may be sloped as compared to the surface of the inductive charger. The alignment feature may include a plurality of alignment features that cross at substantially a right angle. A transceiver may be provided for wireless communication with a portable device positioned for charging on the inductive charging surface. The transceiver may receive charging information from the portable device. A user indication may provide an indication if a portable device is positioned to be charged on the inductive charging surface.

BRIEF DESCRIPTION OF THE DRAWINGS

It should be expressly understood that the drawings are included for illustrative purposes and do not represent the scope of the present system. In the accompanying drawings, like reference numbers in different drawings may designate similar elements, portions of similar elements and/or elements with similar functionality. The invention is explained in further detail, and by way of example, with reference to the accompanying drawings wherein.

DETAILED DESCRIPTION OF THE INVENTION

The following are descriptions of illustrative embodiments that when taken in conjunction with the following drawings will demonstrate the above noted features and advantages, as well as further ones. In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims. Moreover, for the purpose of clarity, detailed descriptions of well-known devices, circuits, and methods are omitted so as not to obscure the description of the present system. In the accompanying drawings, like reference numbers in different drawings may designate similar elements and/or features. Objects depicted in the figures are not necessarily drawn to scale and size relationships may be exaggerated for purposes of illustrating operation of the current system.

Figure 1:
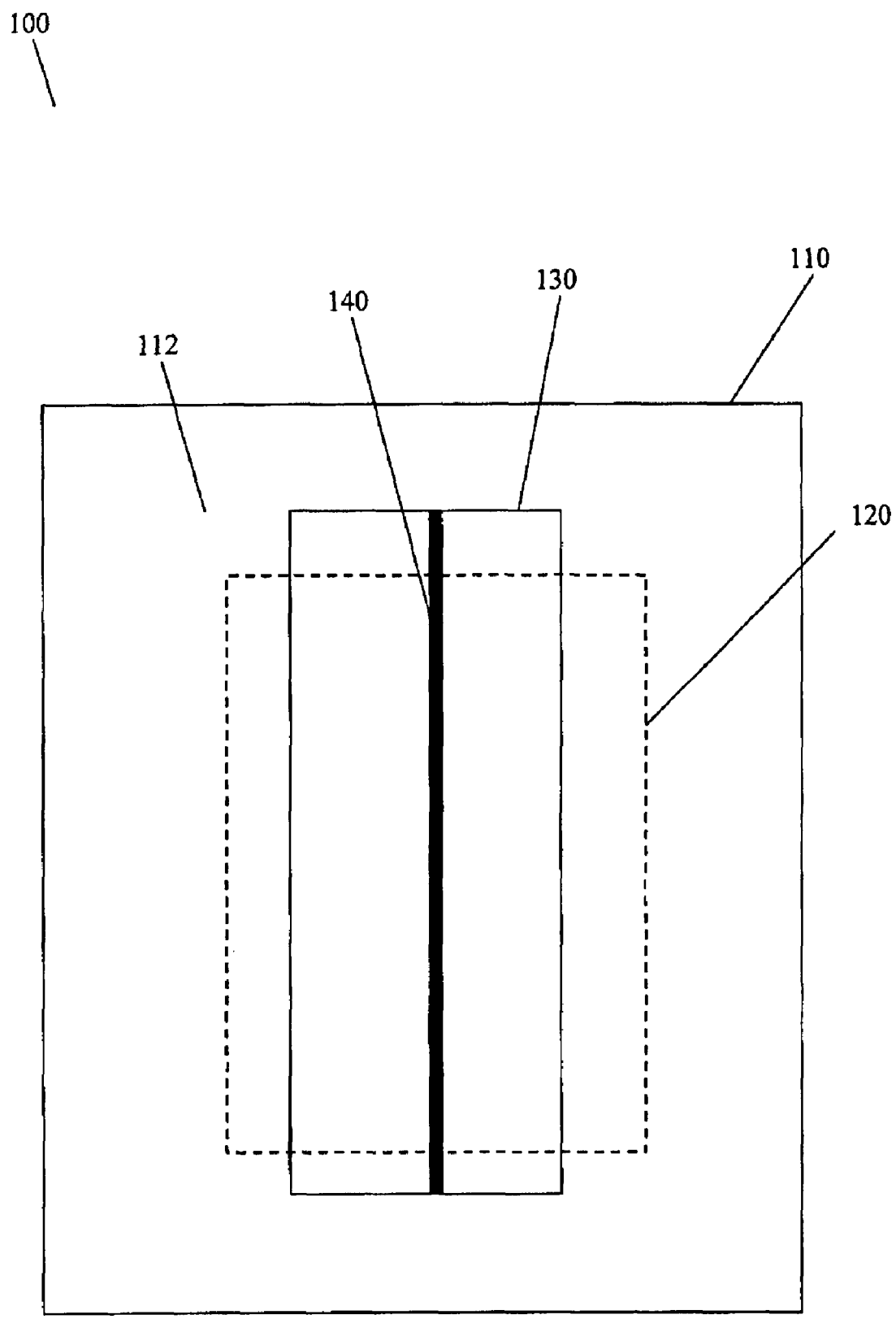
FIG. 1 shows an overhead view of an illustrative system in accordance with an embodiment of the present system.

FIG. 1 shows an overhead view of an illustrative system 100 in accordance with an embodiment of the present system. The system 100 includes a charging device 110 and a portable device 120. The charging device 110 has alignment features, such as alignment features 130, 140. As is known in the art, the methods and apparatus discussed herein may be distributed as an article of manufacture. In accordance with an embodiment of the present system, one or more of the alignment features 130, 140 may simply represent markings on a surface 112 of the charging device 110. In this way, the alignment features facilitate the suitable placement of the portable device 120 for charging by providing a visual reference for placement of the portable device 120. Since there are no mechanical features that interlock with a portable device (e.g., are intended to fit into or be fit into the portable device), the charging device 110 may be utilized with numerous different portable devices and thereby, may serve as a universal charging device 110.

As an example, alignment feature 140 may indicate a desired center of a charging area providing an indication as to how to align the portable device 120 for charging. Alignment feature 130 may provide a basic outline on how to position a typical device for charging. However, since the alignment features 130, 140 are illustratively displayed as opposed to being provided as structural features, the alignment features do not provide an actual positioning constraint on the positioning of the portable device 120. Naturally, in other embodiments, the alignment features may be provided as an etching or other physical feature but still are not intended to provide a physical restriction to positioning of a portable device.

Figure 2:
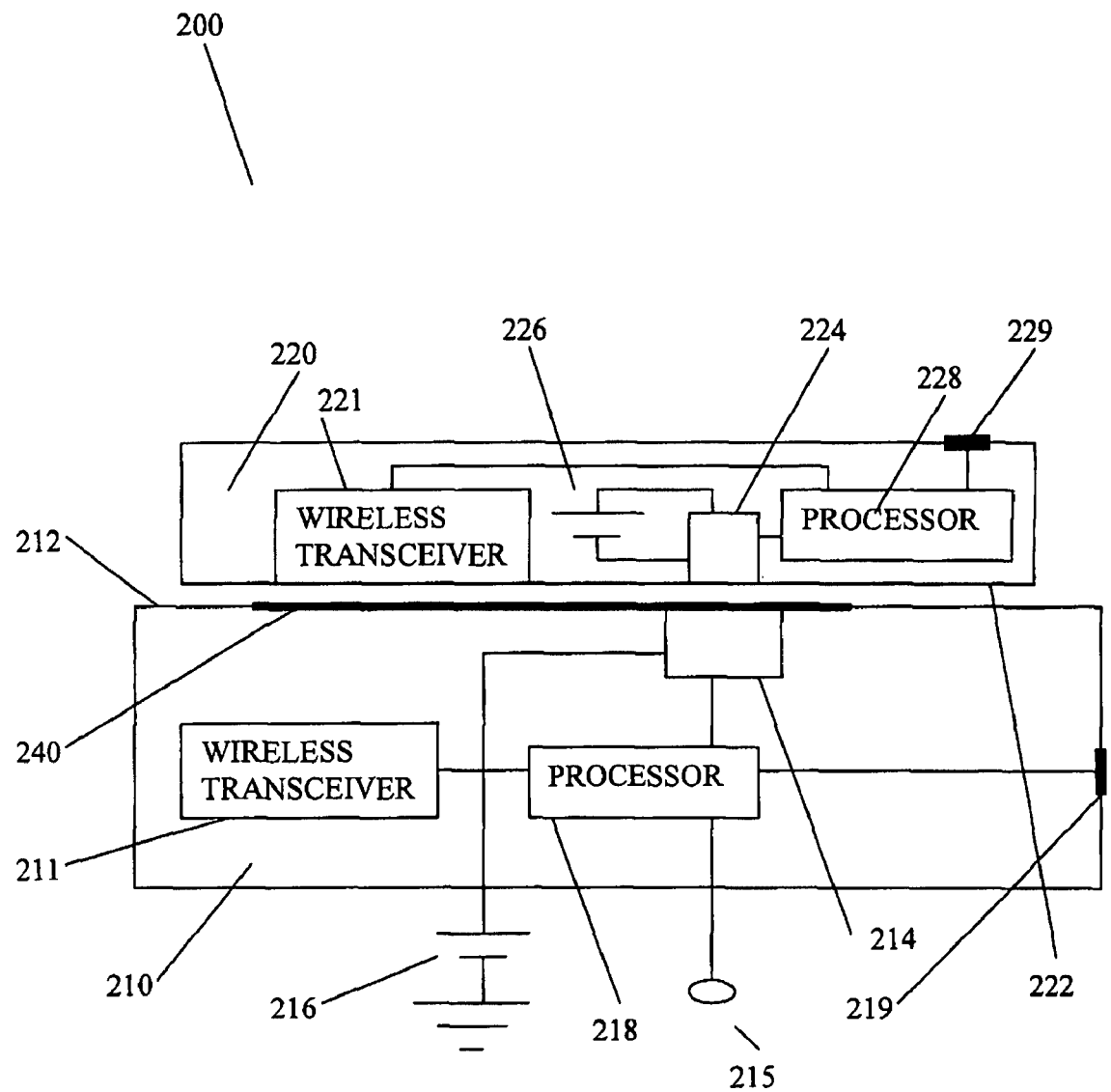
FIG. 2 shows a cross-sectional side view of an illustrative system in accordance with an embodiment of the present system.

FIG. 2 shows a cross-sectional side view of an illustrative system 200 in accordance with an embodiment of the present system. A charging device 210 is illustratively shown having a first winding 214 of a transformer that is powered by a power source 216 and is controlled by a processor 218. A portable device 220 is shown positioned in proximity to the charging device 210. Illustratively, a side 222 of the portable device may be in physical contact with a side 212 of the charging device 210. The portable device 220 includes a second winding 224 of a transformer that is utilized to charge a rechargeable power source 226 for the portable device 220, such as a nickel-cadmium battery, lithium-ion battery, nickel-metal hydride, or any other suitable rechargeable power source as may be readily appreciated. The recharging of the rechargeable power source 226 may be controlled by a processor 228 as may be readily appreciated.

The charging device 210 is shown having an alignment feature 240 that may assist in positioning the secondary winding 224 in operable proximity to the primary winding 214. In this way, the secondary winding 224 of the portable device 220 may be properly positioned with regard to the primary winding 214 of the charging device 210 without requiring complementary mating surfaces (e.g., structural features) that force a given respective positioning. In one embodiment, the portable device 220 may have a user indication 229 that provides an auditory and/or visual indication that the secondary winding 224 is receiving a charging field from the primary winding 214. Similarly, the charging device 210 may have a user indication 219 that provides an auditory and/or visual indication that the secondary winding 224 is properly positioned with respect to the primary winding 214. The user indications 219, 229 may also provide other user information regarding the respective devices as may be readily appreciated.

The charging device 210 may include a wireless transceiver 211 that is operably coupled to the processor 218. Similarly, the portable device 220 may include a wireless transceiver 221 that is operably coupled to the processor 228. In this way, the charging device 210 may be enabled to communicate with the portable device 220 for purposes of controlling the charging operation as well as to enable other communications between the devices. For example, the charging device 210 and the portable device 220 may be operably coupled via respective wireless transceiver 211, 221 to enable an exchange of information (e.g., data), such as during a synchronization process between a base device and a portable device as may be readily appreciated by a person of ordinary skill in the art. The wireless transceivers 211, 221 may also exchange information during a recharging process to ensure proper recharging and/or may exchange other information, such as information that may be available to the charging device 210 through use of an external link 215. For example, the external link may be operably coupled to the Internet for receiving information from the Internet that may be transferred to the portable device 220. The wireless transceivers 211, 221 may communicate though any wireless communication medium including WiFi, Bluetooth, optical, such as infrared (IR) and/or others. In one embodiment, communication between the charging device 210 and the portable device 220 may be through the primary and secondary windings 214, 224 wherein the coupling field between the devices is modulated between the devices, using unique or sufficiently conditioned standard communication protocols, as a means of effecting exchange of data. In one embodiment, for example, sequences of charging pulses may be intended as an exchange of data. Other systems and/or protocols may be utilized for this exchange. Additionally, the secondary winding 224 may operate as a primary winding for transmitting information to the charging device 210.

Figure 3:
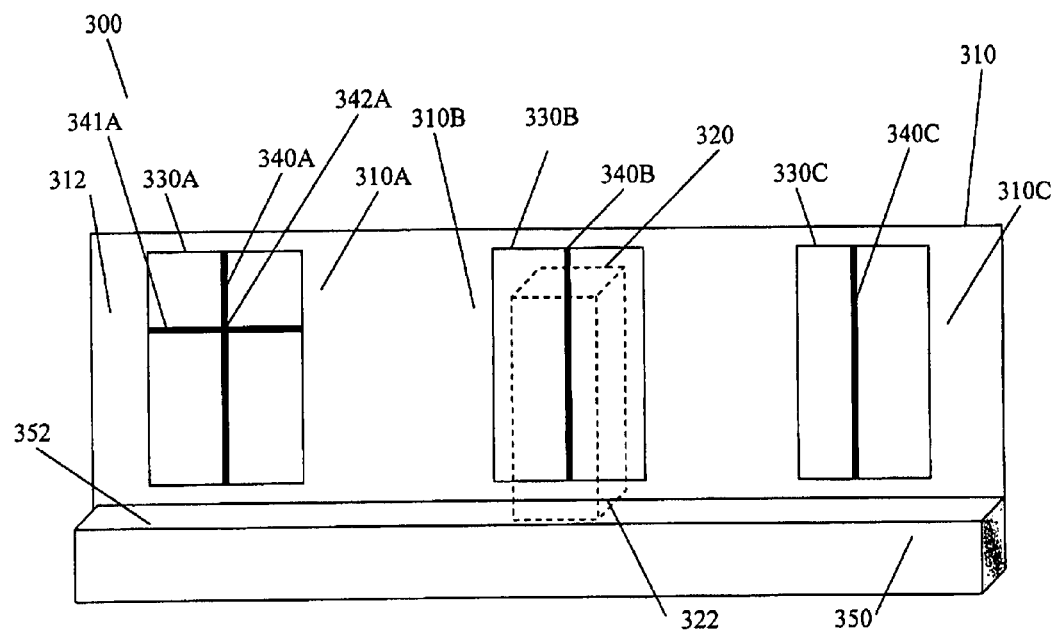
FIG. 3 shows an overhead view of an embodiment of a charging system in accordance with the present system.

FIG. 3 shows an overhead view of an embodiment of a charging system 300 in accordance with the present system. FIG. 3 shows a charging device 310 having a field of inductive charging systems 310A, 310B, 310C. The charging device 310 has corresponding alignment features 330A, 330B, 330C and 340A, 340B, 340C. In addition, the charging base 310 has an alignment feature 350, illustratively running perpendicular to a direction of the alignment features 330A, 330B, 330C and 340A, 340B, 340C and passing through a plurality of the field of inductive chargers 310A, 310B, 310C. The alignment feature 350 may aid in the positioning of a portable device 320 on one of the field of inductive chargers. The alignment feature 350 has a surface 352 that extends outward from a surface 312 of the charging device 310. For example, the surface 352 may extend substantially outward and perpendicular to the surface 312. In this way, the surface 352 may assist in positioning a corresponding surface 322 of the portable device 320.

In one embodiment, charging system 310A may have an additional alignment feature 341A that crosses alignment feature 340A to indicate a center portion 342A of the inductive charging system 340A. In this way, a centering alignment feature is provided to assist in placement of a portable device onto the inductive charging surface. The alignment feature 341A may be positioned in one or more of the inductive charging systems 310A, 310B, 310C. The alignment feature 341A may extend substantially perpendicular to one or more of the alignment features 340A, 340B, 340C. By the term substantially as utilized herein, it is intended that the feature may be within ten degrees of perpendicular or parallel as stated. For example, the features may be cross at an angle between eighty and one hundred degrees, and in one embodiment between eighty-five and ninety-five degrees, and be considered substantially perpendicular in accordance with the present system. Naturally other alignment features may be provided such as a bulls-eye shaped alignment feature, etc.

Figure 4:
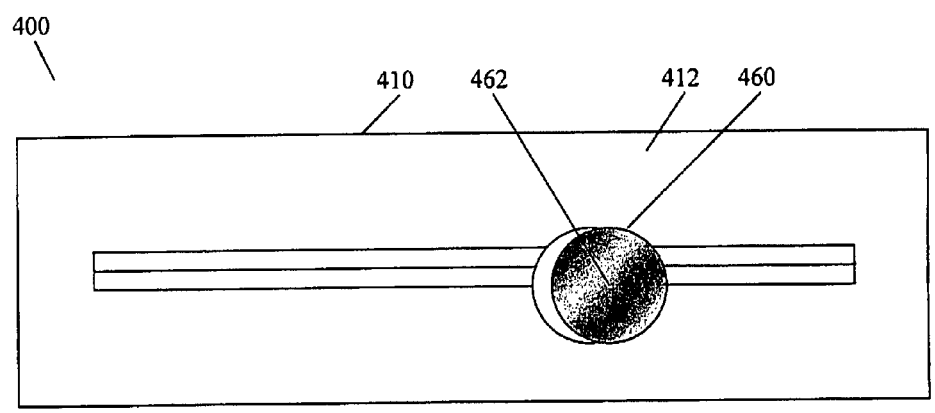
FIG. 4 shows an overhead view of an alternate embodiment of a charging system in accordance with the present system.

FIG. 4 shows an overhead view of an embodiment of a charging system 400 in accordance with the present system. FIG. 4 shows an alignment feature 460 that enables an efficient charging and communication coupling of inductive surfaces of a charging device 410 and a portable device (not shown). In this embodiment, the alignment feature 460 may incorporate an inductive charging system providing an inductive surface 462. The inductive surface 462 may be parallel to a surface 412 of the charging device 410 or may be angled with respect to the surface 412 to enable close proximity and/or contact between the inductive surface 462 and a surface of the portable device.

Figure 5:
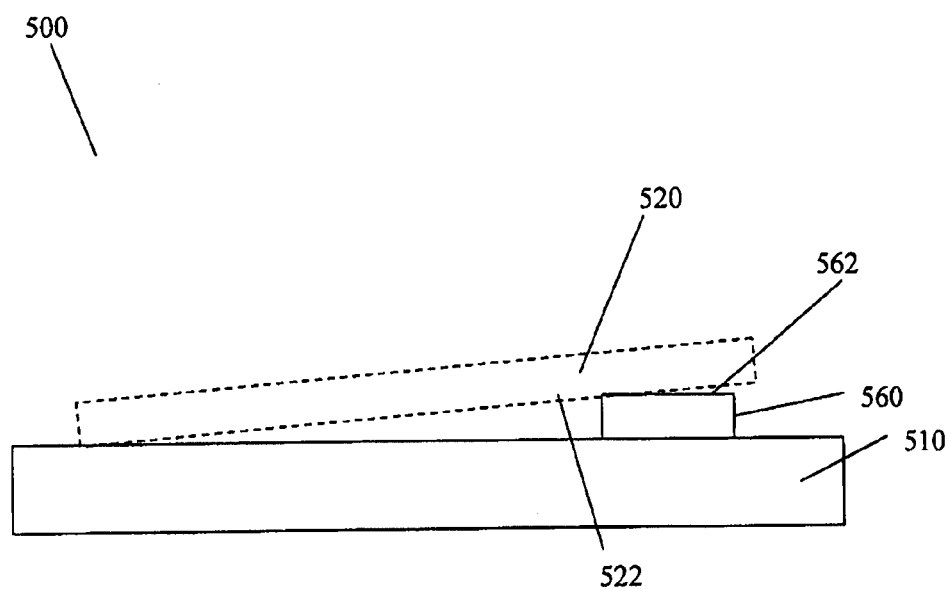
FIG. 5 shows a cross-sectional side view of an illustrative system in accordance with an embodiment of the present system that is similar in construction to the system shown in FIG. 4.

FIG. 5 shows a cross-sectional side view of an illustrative system 500 in accordance with an embodiment of the present system that is similar in construction to the system 400. The system 500 includes a charging device 510 having an alignment feature 560 incorporating an inductive charging system and having an inductive surface 562. A portable device 520 is shown in contact with a portion of the inductive surface 562. Through use of the alignment feature 560, a charging portion of the portable device is ensured to be in close proximity to the inductive surface 562, even in a case wherein a bottom surface 522 of the portable device 520 has an irregular shape.

Figure 6:
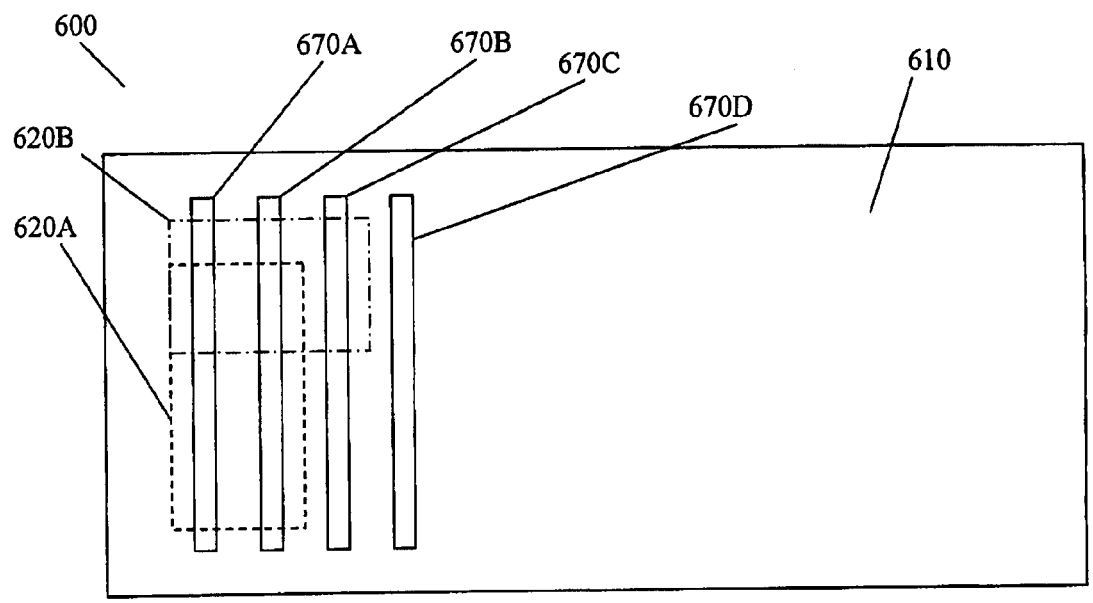
FIG. 6 shows an overhead view of a further embodiment of a charging system in accordance with the present system.

FIG. 6 shows an overhead view of an embodiment of a charging system 600 in accordance with the present system. FIG. 6 shows alignment features 670A, 670B, 670C, 670D of a charging device 610 that are positioned closer to each other than shown in previous embodiments. The alignment features 670A, 670B, 670C, 670D indicate positioning of corresponding underlying inductive charging devices. A portable device 620A is shown positioned predominantly running in a direction parallel to the alignment features 670A, 670B, 670C, 670D. In the position depicted, the portable device 620A is shown in inductive proximity to two (2) of the alignment features 670A, 670B. Accordingly, the portable device 620A may receive either of a stronger combined induced electric field from the corresponding two inductive charging devices 670A, 670B (e.g., stronger than received from either one independently) or may receive two independent electric fields. In any event, the electric field from the inductive charging devices may be utilized by one or more corresponding second windings in the portable device 620A to charge one or more rechargeable power supplies. If desired, the portable device 620A may be positioned so as to only overlie one of the inductive charging devices as may be readily appreciated.

Conversely, a portable device 620B is shown positioned predominantly running in a direction perpendicular to the alignment features 670A, 670B, 670C, 670D. In the position depicted, the portable device 620B is shown in inductive proximity to three of the alignment features 670A, 670B, 670C. Accordingly, the portable device 620B may receive either of a stronger combined induced electric field (e.g., stronger than from one or two inductive chargers) from the corresponding three inductive charging devices or may receive three independent electric fields. In any event, the electric field from the inductive charging devices 670A, 670B, 670C may be utilized by one or more corresponding second windings in the portable device to charge one or more rechargeable power supplies. In this way, a device that is similar in size as either of portable devices 620A, 620B may be positioned to fulfill different charging requirements as desired.

Of course, it is to be appreciated that in accordance with the present system, any one of the above, elements, embodiments and/or processes may be combined with one or more other elements, embodiments and/or processes. For example, alignment features of any of the depicted embodiments may be combined. For example, the alignment feature 350 may be utilized in combination with the alignment feature 560 to facilitate positioning of the portable device. Further, the alignment feature 341A may also be similarly utilized in other embodiments depicted herein or even in place of the depicted alignment features. Accordingly, numerous combinations would readily occur to a person of ordinary skill in the art. These and other variations should be understood to be within the scope of the presented claims. Accordingly, the present system provides a flexible charging system, such as a flexible inductive charging system. As should be clear from the discussion herein, the present system overcomes disadvantages and/or makes improvements over other systems.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed elements may be comprised of hardware portions (e.g., including discrete and integrated electronic circuitry), software portions (e.g., computer programming), and any combination thereof;
f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The claimed invention is:

1. An inductive charging system comprising:
   an inductive charger comprising an inductive charging surface; and
   an alignment marking feature depicted on a surface of the inductive charger indicating a location of the inductive charging surface; and
   a transceiver configured for wireless communication of data with a portable device positioned for charging on the inductive charging surface.

2. The system of claim 1, comprising a structural feature, wherein the structural feature extends substantially perpendicular to the alignment marking feature and provides a guide for positioning of a portable device to facilitate inductive charging of the portable device by the inductive charging surface.

3. The system of claim 1, wherein the inductive charger comprises a plurality of inductive chargers.

4. The system of claim 3, wherein the plurality of inductive chargers comprises a field of inductive chargers positioned to facilitate charging of a portable device by two or more of the plurality of the inductive chargers.

5. The system of claim 1, wherein the inductive charging surface is a raised surface extending outward from the surface of the inductive charger.

6. The system of claim 5, wherein the inductive charging surface is parallel to the surface of the inductive charger.

7. The system of claim 5, wherein the inductive charging surface is sloped as compared to the surface of the inductive charger.

8. The system of claim 1, wherein the alignment marking feature comprises a plurality of alignment marking features that cross at substantially a right angle.

9. The system of claim 1, wherein the transceiver is configured for receiving charging information from the portable device.

10. The system of claim 1, comprising a primary transformer winding arranged to be inductively coupled to a secondary transformer winding of a portable device, wherein the transceiver is configured from the primary and secondary windings.

11. The system of claim 1, comprising a user indication configured for providing an indication if a portable device is positioned to be charged on the inductive charging surface.

12. method of providing an inductive charging system, the method comprising the acts of:
   providing an inductive charging surface;
   providing an alignment marking feature on a surface of the inductive charger indicating a location of the inductive charging surface; and
   providing a transceiver configured for wireless communication of data with a portable device positioned for charging on the inductive charging surface.

13. The method of claim 12, comprising the act of providing a structural feature arranged to extend substantially perpendicular to the alignment marking feature to guide positioning of a portable device to facilitate inductive changing of the portable device by the inductive charging surface.

14. The method of claim 12, wherein the act of providing an inductive charger comprises an act of providing a plurality of inductive chargers.

15. The method of claim 14, wherein the act of providing the plurality of inductive chargers comprises the act of providing a field of inductive chargers positioned to facilitate charging of a portable device by two or more of the plurality of the inductive chargers.

16. The method of claim 12, wherein the inductive charging surface is provided as a raised surface extending outward from the surface of the inductive charger.

17. The method of claim 16, wherein the inductive charging surface is provided as one of parallel and sloped to the surface of the inductive charger.

18. The method of claim 12, comprising an act of providing a communication path between the inductive charging system and a portable device through use of a primary and secondary transformer inductively coupled together to act as the transceiver.

19. The method of claim 12, wherein the act of providing the alignment marking feature comprises providing a plurality of alignment features that cross at substantially a right angle.

20. The method of claim 12, comprising an act of communicating with a portable device to receive charging information from the portable device.

21. The method of claim 19, comprising an act of modulating a coupling field between the inductive charging system and the portable device, wherein the modulated coupling field is the communication path between the inductive charging system and the portable device.

* * * * *

UNITED STATES PATENT AND TRADEMARK OFFICE
CERTIFICATE OF CORRECTION

| | | |
|---|---|---|
| PATENT NO. | : 7,667,431 B2 | Page 1 of 1 |
| APPLICATION NO. | : 11/687136 | |
| DATED | : February 23, 2010 | |
| INVENTOR(S) | : Tilley et al. | |

It is certified that error appears in the above-identified patent and that said Letters Patent is hereby corrected as shown below:

ON THE FACE PAGE

On the Face Page, in Field (57), under "ABSTRACT", in Column 2, Line 7, delete "changing" and insert -- charging --, therefor.

IN THE SPECIFICATION

In Column 2, Line 26, delete "changing" and insert -- charging --, therefor.

IN THE CLAIMS

In Column 8, Line 1, in Claim 12, delete "method" and insert -- A method --, therefor.

In Column 8, Line 13, in Claim 13, delete "changing" and insert -- charging --, therefor.

In Column 8, Line 43, in Claim 21, delete "claim 19," and insert -- claim 18, --, therefor.

Signed and Sealed this
Eighth Day of May, 2012

David J. Kappos
*Director of the United States Patent and Trademark Office*